US010037235B2

United States Patent
Jenkins et al.

(10) Patent No.: US 10,037,235 B2
(45) Date of Patent: Jul. 31, 2018

(54) INTEGRATING APPLICATIONS

(71) Applicant: Walmart Apollo, LLC, Bentonville, AR (US)

(72) Inventors: Gary Dwayne Jenkins, Bella Vista, AR (US); Randy Dean Sams, Fayetteville, AR (US); Timothy Lars Brush, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/470,057

(22) Filed: Mar. 27, 2017

(65) Prior Publication Data

US 2017/0199774 A1 Jul. 13, 2017

Related U.S. Application Data

(63) Continuation of application No. 15/048,128, filed on Feb. 19, 2016, now Pat. No. 9,612,889.
(Continued)

(51) Int. Cl.
*G06F 9/44* (2018.01)
*G06F 9/54* (2006.01)
(Continued)

(52) U.S. Cl.
CPC .............. *G06F 9/546* (2013.01); *G06F 9/541* (2013.01); *H04L 45/122* (2013.01); *H04L 45/20* (2013.01);
(Continued)

(58) Field of Classification Search
CPC .................................. G06F 8/71; G06F 9/546
(Continued)

(56) References Cited

U.S. PATENT DOCUMENTS 7,020,697 B1   3/2006   Goodman et al.
7,188,345 B2   3/2007   Gilfix
(Continued)

FOREIGN PATENT DOCUMENTS

WO    WO2013127059 A1    9/2013

OTHER PUBLICATIONS

"Fusion Middleware Concepts and Technologies Guide for Oracle Application Integration Architecture Foundation Pack," downloaded on Feb. 18, 2016.

*Primary Examiner* — Andy Ho
(74) *Attorney, Agent, or Firm* — Patterson Thuente Pedersen., P.A.

(57) ABSTRACT

The present disclosure extends to methods, systems, and computer program products for integrating applications. In general, aspects of the invention can be used to reduce complexities associated with integrating applications and conserve computer system resources. Designed message processing functionality as well as updates and changes can be maintained through a centralized application message processing framework and then used by a plurality of applications. The centralized application message processing framework significantly reduces, and potentially eliminates, the need to incorporate message processing functionality individually into each of the plurality of applications. This in turn reduces the burden and complexity of maintaining message processing functionality for the plurality of applications.

20 Claims, 12 Drawing Sheets

Related U.S. Application Data

(60) Provisional application No. 62/126,344, filed on Feb. 27, 2015.

(51) Int. Cl.
*H04L 12/733* (2013.01)
*H04L 12/771* (2013.01)
*H04L 12/58* (2006.01)
*H04L 29/06* (2006.01)

(52) U.S. Cl.
CPC .............. *H04L 45/56* (2013.01); *H04L 51/26* (2013.01); *H04L 69/22* (2013.01)

(58) Field of Classification Search
USPC .......................................... 719/313; 717/120
See application file for complete search history.

(56) References Cited

U.S. PATENT DOCUMENTS

| | | |
|---|---|---|
| 7,234,132 B2 | 6/2007 | Lam |
| 7,395,540 B2 | 7/2008 | Rogers |
| 7,774,289 B2 | 8/2010 | Aniszczyk |
| 8,024,476 B2 * | 9/2011 | Eydelman ......... H04L 29/06027 709/238 |
| 8,443,374 B2 | 5/2013 | Li et al. |
| 8,473,943 B2 | 6/2013 | Dujmovic |
| 8,584,081 B2 | 11/2013 | Fernando |
| 8,611,275 B2 | 12/2013 | Yarvis et al. |
| 8,671,392 B2 | 3/2014 | Jahr et al. |
| 8,982,887 B2 * | 3/2015 | Curtis ..................... H04L 45/00 370/392 |
| 9,112,805 B2 * | 8/2015 | Hui ......................... H04L 45/34 |
| 2005/0033588 A1 | 2/2005 | Ruiz et al. |
| 2006/0133412 A1 | 6/2006 | Callaghan |
| 2010/0229081 A1 | 9/2010 | Rothbucher |

\* cited by examiner

INTEGRATING APPLICATIONS

RELATED APPLICATIONS

This application is a continuation of application Ser. No. 15/048,128 filed Feb. 19, 2016, now U.S. Pat. No. 9,612,889, issued Apr. 4, 2017, which claims the benefit of U.S. Provisional Application No. 62/126,344 filed Feb. 27, 2015, each of which is hereby fully incorporated herein by reference.

TECHNICAL FIELD

This invention relates generally to the field of application integration and more specifically to processing messages being passed between applications.

BACKGROUND

There are a variety of conventional technologies that can be used to integrate applications with one another. However, most, if not all, of these technologies are not optimally suited for organizations that have larger numbers of orchestrations, competing initiatives, and resource limitations.

In a more basic integration environment, one application does not know how to communicate with another application. For example, one entity can have a data application that generates financial data and needs to have the financial data represented in various reports. Another entity can have a report application for generating reports from financial data. However, the one entity may not know how to communicate financial data from the data application to the report application at other entity. To solve the communication problem, code for either or both of the application and the other application can be redesigned and recompiled to communicate with one another. Code redesign can be relatively simply, such as, for example, using a Dynamic Link Library ("DLL") configured to convert between the output of the data application and the input of the report application.

Even though code redesign is relatively simple, at larger scales and in more complex environments, code redesign can be costly and can significantly burden application developers and designers. For example, as a company grows it can use disparate data generation applications, reporting applications, payroll processing applications, accounts receivable applications, accounts payable applications, point-of-sale ("POS") applications, etc. Each of the applications are potentially owned by different entities and designed with different expectations. Some or all of these applications may need to communicate with one another to facilitate solutions for the entity. Thus, each time the requirements of one application change, many other applications must be redesigned to account for the changed requirements. As the number of applications used by an entity grows, the difficulties, required resources, and costs associated with maintaining communication between the applications further increases (potentially approximating exponential growth).

Further, some entities may have multiple applications designed to solve the same problem in different ways and/or in different geographic locations. For example, when one entity purchases another entity, the purchasing entity may inherit applications from the purchased entity. The purchasing entity may desire to set up a centralized system for all back office solutions. As such, the purchasing entity has to integrate redundant and/or disparate applications into a central application solution. The central application solution can include potentially hundreds of unique integrations and must be maintained as application requirements of individual applications change over time.

BRIEF DESCRIPTION OF THE DRAWINGS

The specific features, aspects and advantages of the present invention will become better understood with regard to the following description and accompanying drawings where.

DETAILED DESCRIPTION

Figure 1:
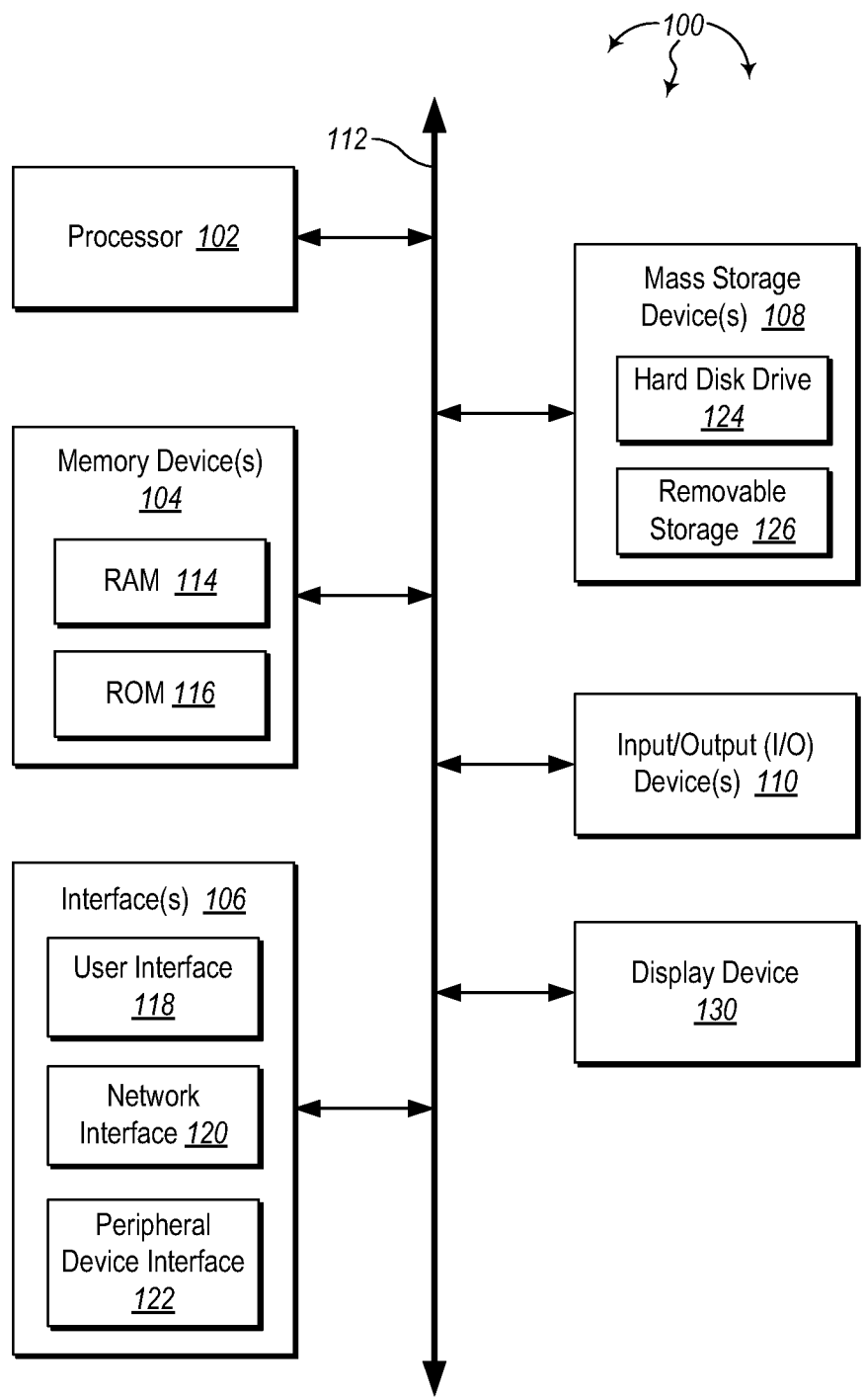
FIG. 1 illustrates an example block diagram of a computing device.

The present invention extends to methods for integrating applications. An application message processing framework can include one or more hops. The one or more hops can include one or more of: an entry hop, one or more intermediate processing hops, and an exit hop. A hop accesses a message being passed through the application message processing framework. The message includes data and a header. The data is being passed from an application to another application to integrate the application with the other application. The header defines a route of one or more hops between the application and the other application along with one or more designated services that are to be applied to the data along the defined route to facilitate the integration.

The hop determines that at least one designated service is included in the one or more data processing services offered at the hop. For each designated service, the hop invokes the designated service, executes the designated service to process the data into processed data in the manner defined for the service, catalogs metrics related to execution of the designated service. The hop determines a next module (e.g., another hop or the other application) in the route that is to receive the processed data based on the header. The hop sends the processed data to a next module indicated in the route.

In other aspects, message processing functionality provided by an application message processing framework is reconfigured. A message processing functionality change is accessed. The message processing functionality change is to be applied to the application message processing framework to change the message processing functionality available through the application message processing framework. The message processing functionality change is incorporated into the application message processing framework without altering other message processing functionality available through the application message processing framework. The message processing functionality change is incorporated by performing at least one of: adding a new intermediary hop to the application message processing framework and removing an existing intermediary hop from the application message processing framework.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, watchers, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, aspects of the invention can be used to reduce complexities associated with integrating applications and conserve computer system resources. Designed message processing functionality can be incorporated into a centralized application message processing framework and then used by a plurality of applications. Subsequent message processing updates/changes can also be incorporated into the centralized application message processing framework and then used by the plurality of applications. As such, a designer can maintain message processing functionality through the centralized application message processing framework.

Maintaining message processing functionality through the centralized application message processing framework significantly reduces, and potentially eliminates, the need to incorporate message processing functionality individually into each of the plurality of applications. This in turn reduces the burden and complexity of maintaining message processing functionality for the plurality of applications. For example, among other advantages, testing message processing changes and updates is significantly reduced. A designer may test changes/updates to message processing functionality offered through the application message processing framework but is relieved from having to individually test each of the plurality of applications.

Accordingly, through the centralized application message processing framework, the plurality of applications is provided with message processing functionality for integrating the plurality of applications with one another. However, since the message processing functionality is not included in the individual applications, storage requirements for storing the plurality of applications are reduced. Further, during execution, memory requirements for running each of the individual applications are also reduced.

Within this description and the following claims, a "hop" is defined as a limited scope unit of work having an entry and an exit that is built on a repeatable pattern. A plurality of different message processing services can be available at a hop. Message processing functionality at a hop can be varied (e.g., tailored to facilitate communication between designated applications) by executing different combinations of message processing services available at the hop. In some aspects, a hop catalogs metrics around service execution, such as, for example, processing time and execution success.

Within this description and the following claims, a "message processing framework" is defined as a plurality of interconnectable hops configured to provide message processing routes between applications.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various hardware storage devices, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
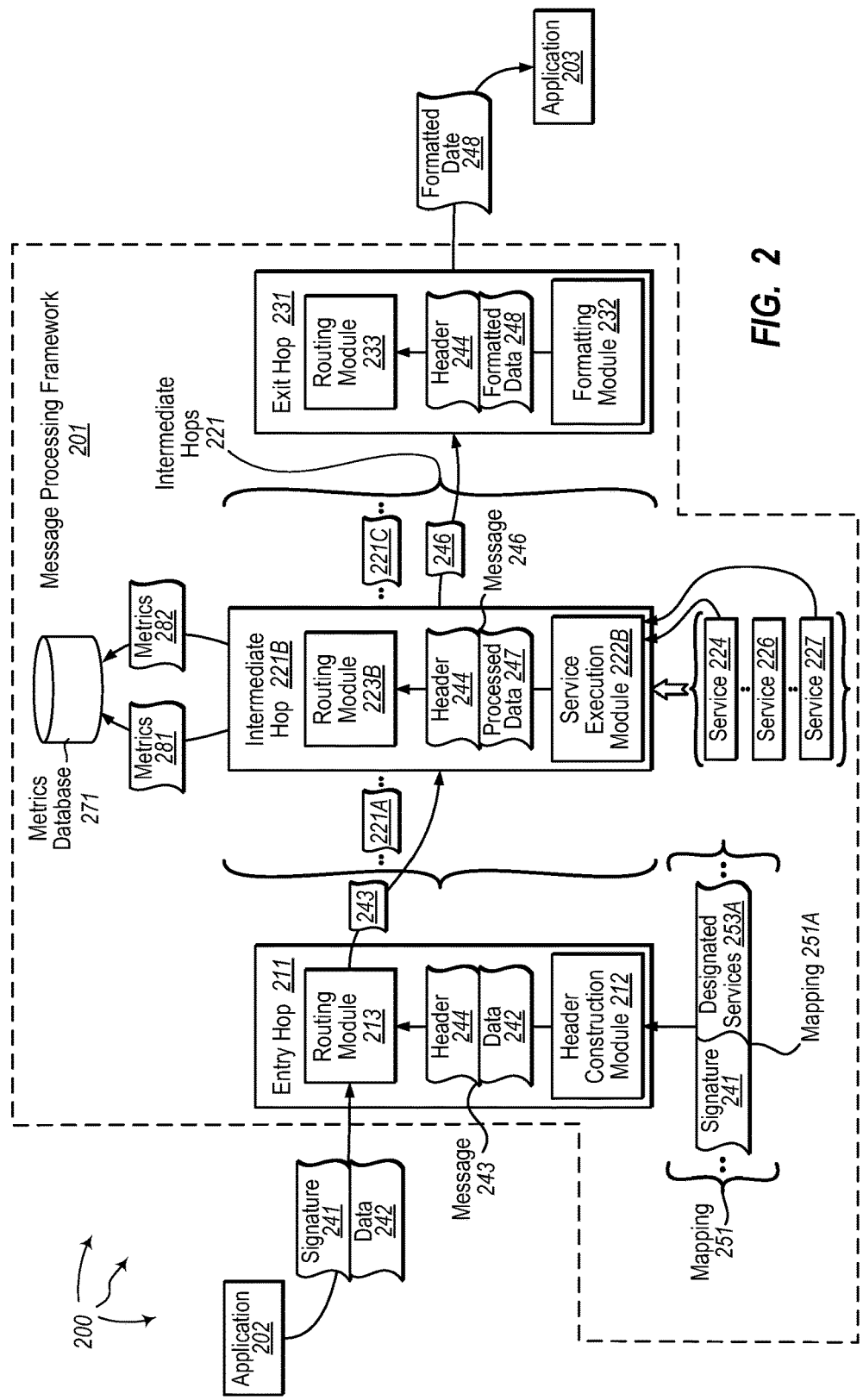
FIG. 2 illustrates an example computer architecture that facilitates integrating applications.

FIG. 2 illustrates an example computer architecture 200 that facilitates integrating applications. As depicted, computer architecture 200 includes message processing framework 201, application 202, and application 203. Message processing framework 201, application 202, and application 203 can be connected to one another via a network, such as, for example, a local area network (LAN), a wide area network (WAN), or any other type of communication network. In one exemplary embodiment, the network comprises the Internet, and messages are communicated across the network using transmission control protocol/Internet protocol (TCP/IP). However, other types of networks and other types of protocols can be used.

Applications 202 and 203 and potentially one or more additional applications (not shown) can use message processing framework 201 to compatibly exchange data with one another.

In general, message processing framework 201 can include one or more entry hops, one or more intermediate hops, and one or more exit hops. When an application has data to send to another application, the application can send a signature along with the data to message processing framework 201. The signature is indicative of processing that is to be performed on the data prior to delivery to the other application.

An entry hop within message processing framework 201 can receive the signature and the data. The entry hop can map the signature to one or more designated services that provide the indicated processing. The entry hop can formulate a header that indicates how to route the message between an additional one or more hops as well as which, if any, of the one or more designated services are to be executed at each of the additional one or more hops. The entry hop may include one or more available services. Based on the header contents, the entry hop can identify which, if any, of the one or more designated services are included in the one or more available services. The entry hop executes any identified services to process the data in accordance with the header contents. The entry hop puts the header and the (potentially processed) data in a message. Based on the header contents, the entry hop routes the message to the next hop that is to process the message.

The next hop can receive the message from the entry hop. The next hop can be an intermediate hop or an exit hop. An intermediate hop can include one or more available services. Based on the header contents, the intermediate hop identifies which, if any, of the one or more designated services are included in the one or more available services. The intermediate hop executes any identified services to process the data in accordance with the header contents. The intermediate hop puts the header and the processed) data in further message. Based on the header contents, the intermediate hop routes the further message to the next hop that is to process the message. The next hop can be a further intermediate hop or an exit hop.

An exit hop can include one or more available services as well as a mechanism to format processed data for compatible input to the other application. Based on the header contents, the exit hop identifies which, if any, of the one or more designated services are included in the one or more available services. The exit hop executes any identified services to process the data in accordance with the header contents. The exit hop formats the processed data for compatible input to the other application. Based on the header contents, the exit hop routes the formatted data to the other application.

As such, message processing framework 201 handles message processing and data formatting thereby relieving applications from having to performing these tasks.

As depicted, message processing framework 201 includes entry hop 211, intermediate hops 211A, 211B, and 211C, exit hop 231, and metrics database 271. Entry hop 211 includes header construction module 212 and routing module 213. Header construction module 212 is configured to refer to mappings 251 to map signatures to designated services. An administrator or other technical personnel can alter how data from an application is processed by changing designated services mapped to a signature. As such, there is little, if any, need to change, recompile, and redeploy, an application to alter how data from the application is processed. Accordingly, both developer and computer system resources are conserved.

Header construction module 212 can also formulate a route through hops of message processing framework 201 to access the designated services. Header construction module 212 can indicate the formulated route in a header. Header construction module 212 can put received application data and the header in a message. Based on the contents of the header, routing module 213 can route the message to a hop in intermediate hops 221.

Entry hop 211 may also have access to one or more available services. A service execution module at entry hop 211 can refer to a header to identify services, from among the one or more available services, that are to be executed to process data contained in the message. The identified services can be executed to process the data before the message is routed to a hop in intermediate hops 221 or to exit hop 231.

As depicted, intermediate hop 221B includes service execution module 222B and routine module 223B. Services 224, 226, 227, etc. are available for execution at intermediate hop 221B. When a message is received at intermediate hop 221B, service execution module 222B refers to a header to identify services, from among services 224, 226, 227, etc., that are to be executed to process data contained in the message. The identified services can be one or more designated services previously mapped to a signature. Service execution module 222B can execute the identified services to process the contained data. Services 224, 226, 227, etc. can include any of: an auditing service, an authentication service, an authorization service, an accounting service, an exception service, a notification service, a logging service, a support ticketing service, a message replay service, an encryption service, an encoding service, a centralized cache service, and a data enrichment service.

After data is processed, the header and processed data can be included in a message. Based on the contents of the header, routing module 222B can route the message to a next hop, such as, for example, another intermediate hop or an exit hop.

Other intermediate hops, including intermediate hops 221A and 221C can be configured similar to intermediate hop 221B. The other intermediate hops can include one or more available services, a service execution module, and a routing module. The service execution module can refer to a header identify services, from among available services, to execute. The service execution module can execute the identified services to process contained data. After data is processed, the header and processed data can be included in a message. Based on the contents of the header, the routing module can route the message to a next hop, such as, for example, another intermediate hop or an exit hop.

Exit hop 231 includes formatting module 232 and routing module 233. When a message is received at exit hop 231, formatting module 232 can format data contained in the message for compatibility with application 203. Based on the contents of the header, routing module 233 can route the 233 can route the formatted data to application 203.

Exit hop 231 may also have access to one or more available services. A service execution module at exit hop 231 can refer to a header to identify services, from among the one or more available services, that are to be executed to process data contained in the message. The identified services can be executed to process the data before formatted data is routed to application 203.

Thus, it may be that data from an application passes through an entry hop, a plurality of intermediate hops, and an exit hop before delivery to another application.

Metrics database 271 can be used to collect metrics cataloged during the execution of services at a hop. As a service is executed at a hop, the hop can catalog metrics around service execution, such as, for example, processing time and execution success. The cataloged metrics can be stored in metrics database 271 for subsequent analysis.

Figure 3:
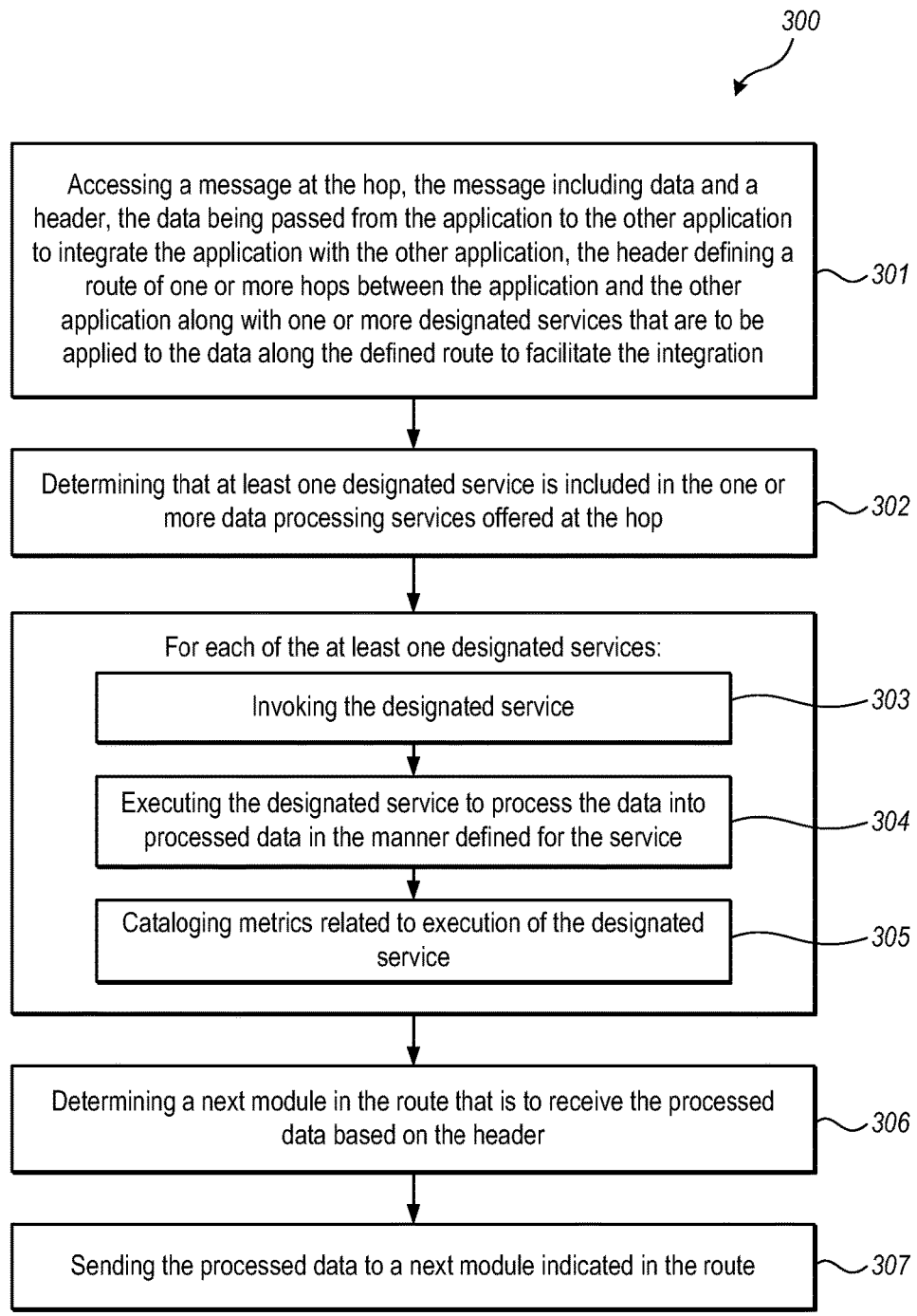
FIG. 3 illustrates an example method for integrating applications.

FIG. 3 illustrates a flow chart 300 of an exemplary method 300 for integrating applications. The method 300 will be described with respect to the components and data of computer architecture 200.

During execution, application 202 can formulate data 242 that is to be passed to application 203 to facilitate integration between application 202 and application 203. Application 202 can send signature 241 and data 242 (e.g., from an API) to message processing framework 201. Entry hop 211 can receive signature 241 and data 242. Header construction module 212 can refer to mappings 251 to identify designated services corresponding to signature 253A. Mappings 251 can be included in a database configuration property file. Header construction module 212 can determine that mapping 251A maps signature 241 to designated services 253A.

Designated services 253A can include one or more services that are available at one or more of intermediate hops 221. In one aspect, designated services 253A are available at the same intermediate hop. In another aspect, different services from among designated services 253A are available at different intermediate hops.

Header construction module 213 formulates header 244. Header 244 defines a route through intermediate hops 221 to access each service included in designated services 253A (e.g., in a desired order). Header construction module 212 forms message 243 containing header 244 and data 242. Routing module 213 examines header 244. Based on the content of header 244, routing module 213 determines that message 243 is to be routed to intermediate hop 221B. Routing module 213 sends message 243 to intermediate hop 221B.

Method 300 includes accessing a message at the hop, the message including data and a header, the data being passed from the application to the other application to integrate the application with the other application, the header defining a route of one or more hops between the application and the other application along with one or more designated services that are to be applied to the data along the defined route to facilitate the integration (301). For example, intermediate hop 221B can receive message 243 from entry hop 211.

Method 300 includes determining that at least one designated service is included in the one or more data processing services offered at the hop (302). For example, based on the content of header 244, service execution module 222B can determine that services 224 and 227 are included in designated services 253A.

Method 300 includes for each of the at least one designated services: invoking the designated service (303), executing the designated service to process the data into processed data in the manner defined for the service (304), and cataloging metrics related to execution of the designated service (305). For example, service execution module 222B can invoke service 224, execute service 224 to process data 242, and catalog metrics 281 to metrics database 271. Similarly, service execution module 222B can invoke service 227, execute service 227 to process data 242, and catalog metrics 282 to metrics database 271. Execution of services 224 and 227 can process (e.g., audit, authenticate, authorize, encode, encrypt, etc.) data 242 into processed data 247. Service execution module 222B can form message 246 containing header 244 and processed data 247.

Method 300 includes determining a next module in the route that is to receive the processed data based on the header (306). For example, based on the contents of header 244, routing module 223B can determine that exit hop 231 is the next module in the route from application 202 to application 203. Method 300 includes sending the processed data to a next module indicated in the route (307). For example, routing module 2223B can send message 246 to exit hop 231.

Exit hop 231 can receive message 246 from intermediate hop 221B. Formatting module can format processed data 247 into formatted data 248 (e.g., data compatible with an API of application 203). Based on the contents of header 244, exit hop 231 can route formatted data 248 to application 203. Application 203 can take some action on formatted data 248.

When appropriate, application 203 can return data back to application 202 through message processing framework 201. Return data can be passed through the same or different entry and exit hops and can be processed by the same or different services at the same or different intermediate hops.

As described, hops can have limited scope and can contain unique functionality differing from other hops. Having different hops can be advantageous when specific executions are to be performed that do not fit in the mold of a service API, or simply fall outside the scope of service execution. There can also be cases where this meets the criteria for being a configurable service, where the service has the potentially to be long running. Thus, creating a new hop where that specific service executes can be appropriate. Accordingly, a message processing framework can remain nimble, flexible, and capable of adapting to unknown message processing circumstances.

In some aspects, a service execution module includes a hop processing factory and a service execution engine. The hop processing factory controls execution of various services at a hop. The hop processing factory can use configured data to invoke each service. The hop processing factory can also catalog metrics around service execution. The service execution engine takes the task of performing the general processing of each service. The processing can be done based on configured properties of the service. Properties can be defined as a mix of static attributes (e.g., a library class path for instantiation) and custom attributes (e.g., an XML Path Language (XPath) location to a value in an eXtensible Markup Language (XML) request) that fit various application integration scenarios.

Figure 4A:
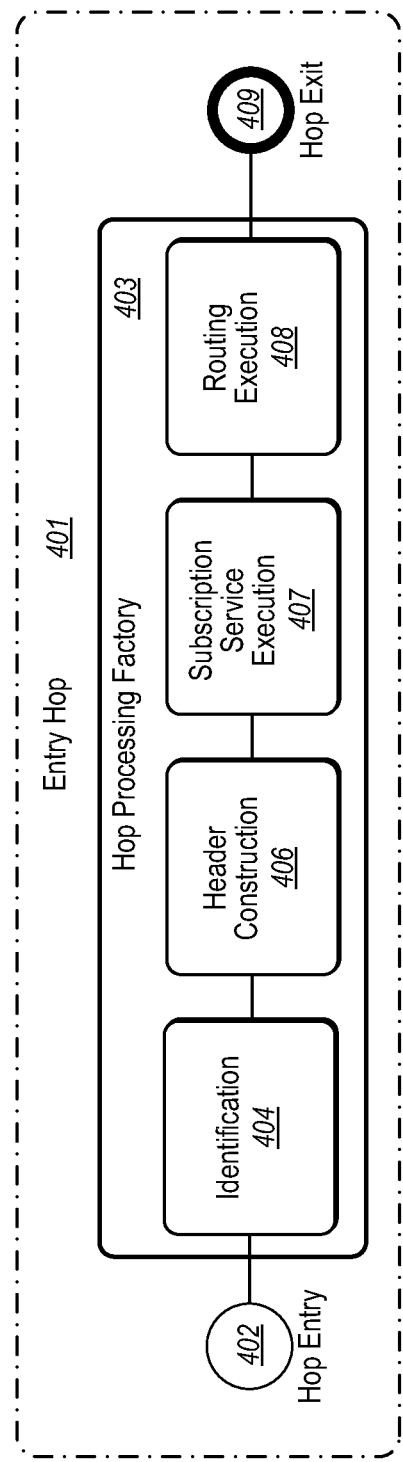
FIGS. 4A and 4B illustrate an example architecture of an entry hop.
Figure 4B:
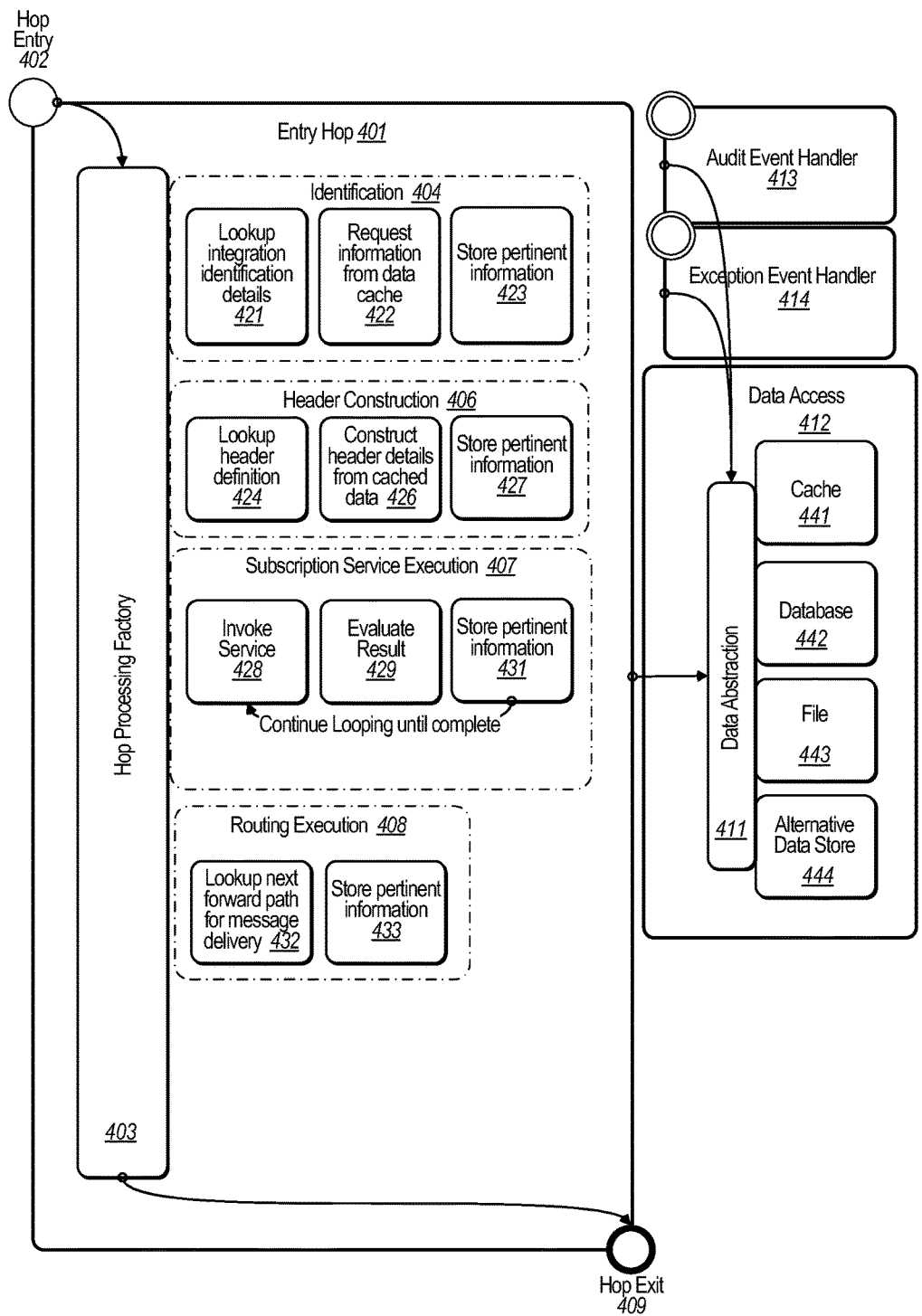

FIGS. 4A and 4B illustrate an example architecture of an entry hop 401. As depicted in FIG. 4A, entry hop 401 includes message entry 402, hop processing factory 403, and message exit 409. In general, hop processing factory 403 oversees the execution of other services at entry hop 401. Hop processing factory 403 includes identification 404, header construction 406, subscription service execution 407, and routing execution 408. Data and a signature can be received from an application at hop entry 402. Identification 404 can map the signature to one or more designated services. Header construction 406 can construct a header indicating how to route the data to the one or more designated services through a message processing framework. Subscription service execution 407 can execute any of the one or more designated services available at entry hop 401. Routing execution 408 can route a message containing the header and data to a next hop.

Turning to FIG. 4B, hop processing factory 403 can build each entry object, execute objects and evaluate results, and throw exception events and log as needed. Data abstraction 411 provides entry hop 401 with data access 412 to one or more storage locations, including: cache 441, database 442, file 443, and alternative data store 444. Audit event handler 413 and exception event handler 414 can log events to the one or more storage locations. Identification 404 can lookup integration identification details 421 from one or more storage locations through data access 412, request information 404 from data cache 441, and store pertinent information 423 to the one or more storage locations through data access 412. Header construction 406 can lookup header definition 428 from the one or more data locations through data access 412, construct header details 426 from stored data, and store pertinent information 427 to the one or more storage locations through data access 412.

Subscription service execution 407 can invoke a service 428, evaluate results 429, and store pertinent information 431 (e.g., metrics) to the one or more storage locations through data access 412. Subscription service execution 407 can continue looping to execute any of one or more designated services available at entry hop 401. Routing execution 406 can lookup 432 a next forward path for message delivery from the contents of a constructed header and store pertinent information 433 to the one or more storage locations through data access 412. Entry hop 401 can send a message containing the constructed header and received data out of hop exit 409 to a next hop (e.g., an intermediate hop or an exit hop).

Figure 5A:
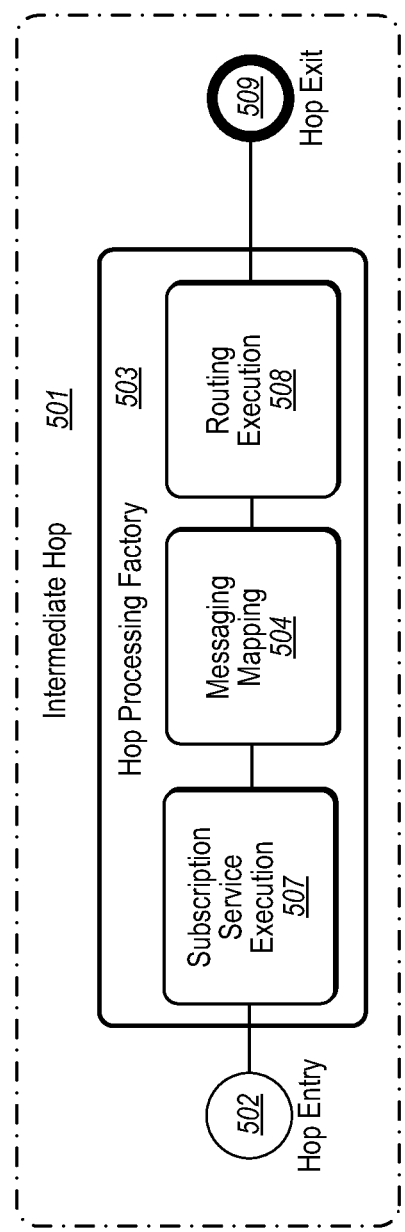
FIGS. 5A and 5B illustrate an example architecture of an intermediate hop
Figure 5B:
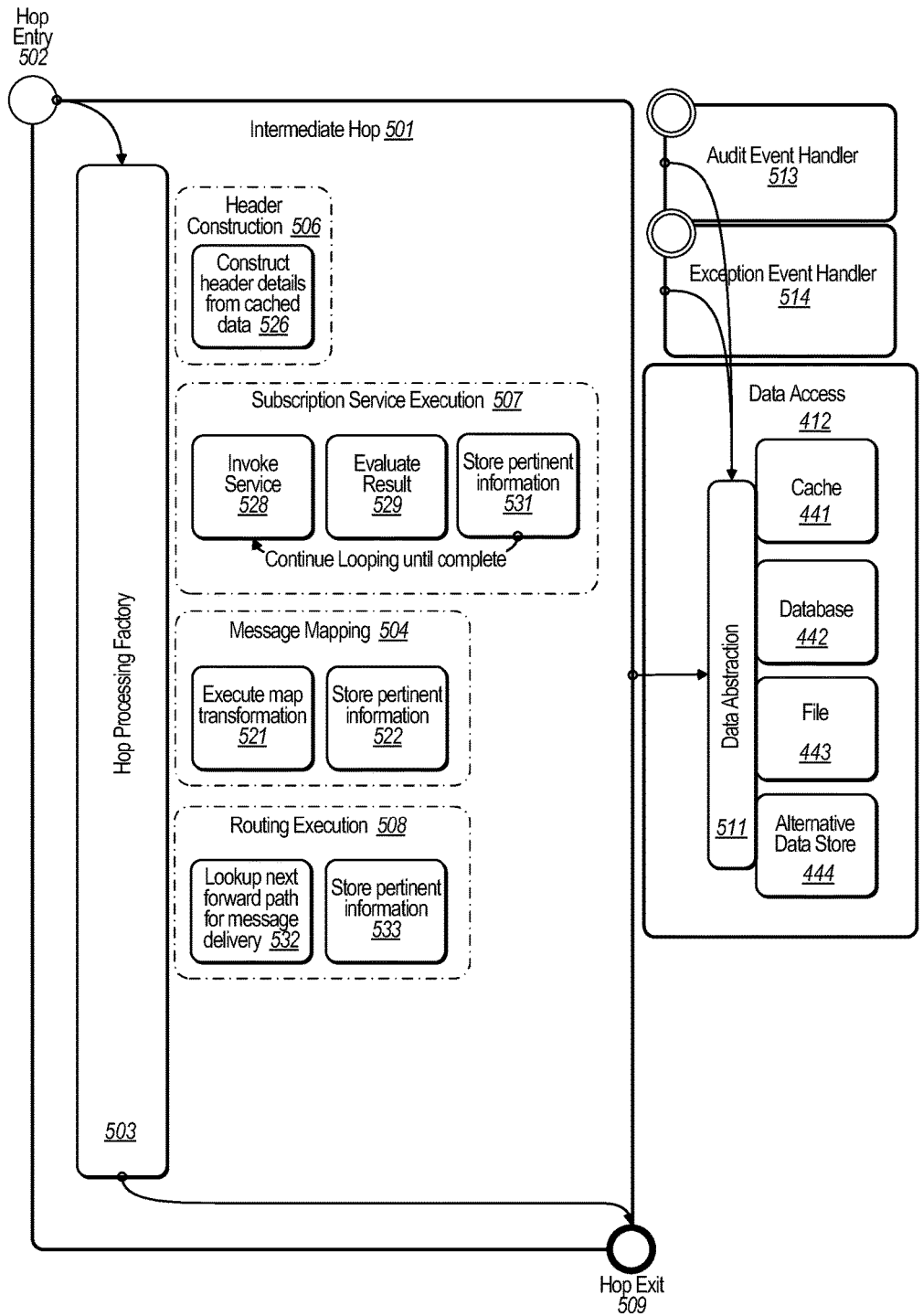

FIGS. 5A and 5B illustrate an example architecture of an intermediate hop. As depicted in FIG. 5A, intermediate hop 501 includes message entry 502, hop processing factory 503, and message exit 509. In general, hop processing factory 503 oversees the execution of other services at intermediate hop 501. Hop processing factory 503 includes subscription service execution 507, message mapping 506, and routing execution 508. A message containing a header and application data can be received from a prior hop at hop entry 502. The application data may or may not have been processed at the prior hop. Subscription service execution 507 can execute any of the one or more designated services available at intermediate hop 501. Message mapping 506 can transform the message to include (potential further) processed data from the execution of services at intermediate hop 501. Routing execution 408 can route a message containing the header and data to a next hop.

Turning to FIG. 5B, hop processing factory 503 can build each data processing (e.g., transformation) object, execute objects and evaluate results, and throw exception events and log as needed. Data abstraction 511 provides intermediate hop 501 with data access 512 to the one or more storage locations, including: cache 441, database 442, file 443, and alternative data store 444. Audit event handler 513 and exception event handler 514 can log events to the one or more storage locations. Header construction 506 can construct a header object 526 from passed header details. Subscription service execution 507 can invoke a service 528, evaluate results 529, and store pertinent information 531 (e.g., metrics) to the one or more storage locations through data access 512. Subscription service execution 507 can continue looping to execute any of one or more designated services available at intermediate hop 501.

Figure 6A:
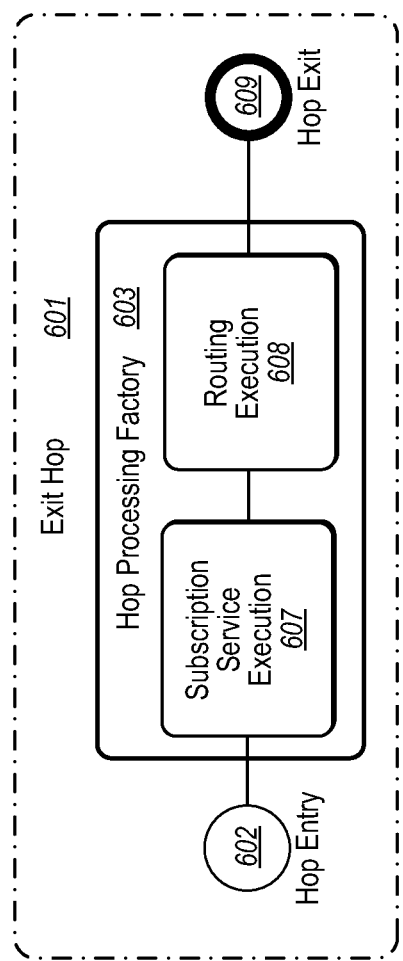
FIGS. 6A and 6B illustrate an example architecture of an exit hop.
Figure 6B:
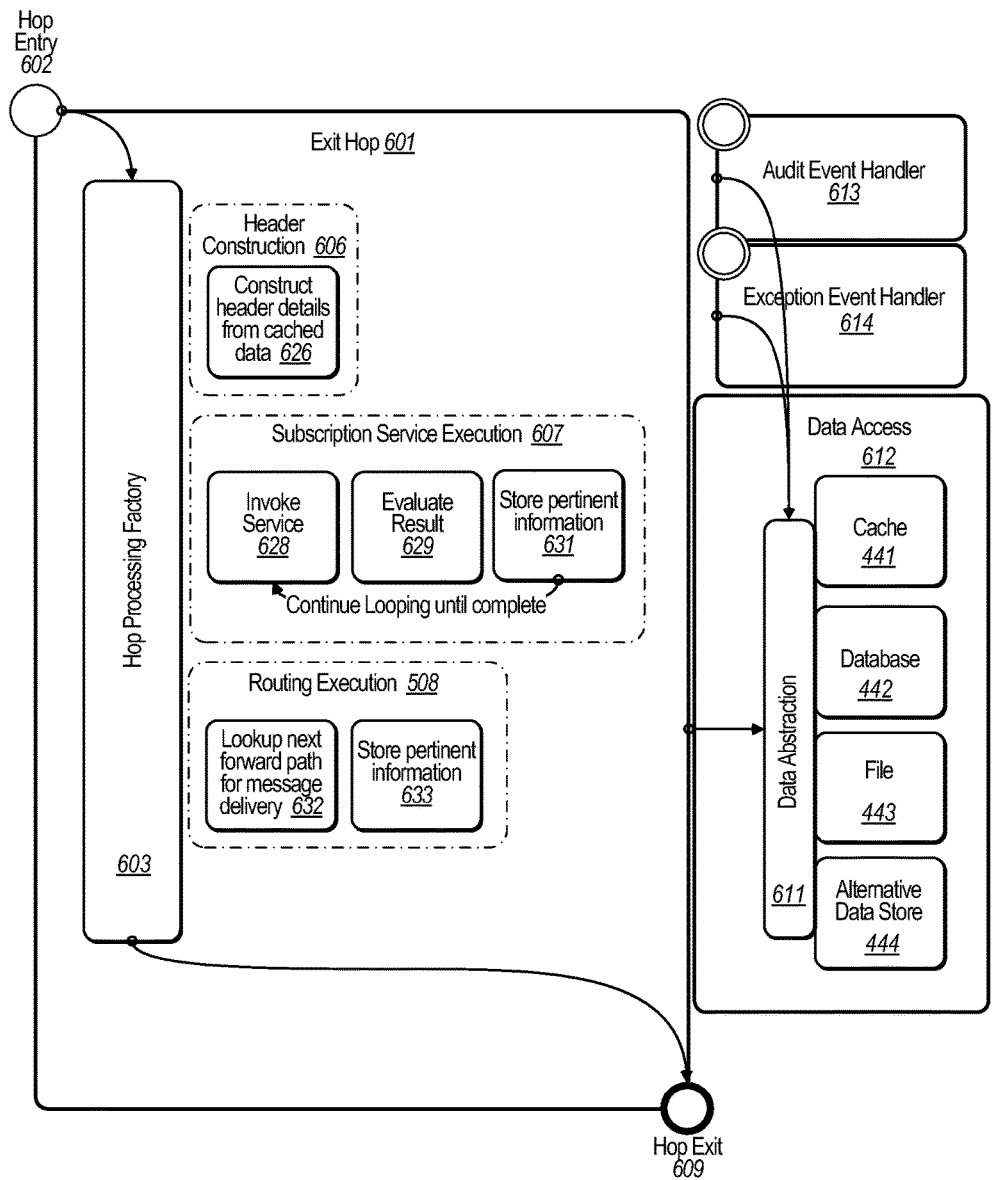

Message mapping 504 can execute map transformation 521 and store pertinent information 522 to the one or more storage locations through data access 512. Routing execution 508 can lookup 532 a next forward path for message delivery from the contents of a constructed header and store pertinent information 533 to the one or more storage locations through data access 512. Intermediate hop 501 can send a message containing the constructed header and processed data out of hop exit 509 to a next hop (e.g., another intermediate hop or an exit hop). FIGS. 6A and 6B illustrate an example architecture of an exit hop. As depicted in FIG. 6A, exit hop 601 includes message entry 602, hop processing factory 603, and message exit 609. In general, hop processing factory 603 oversees the execution of other services at exit hop 601. Hop processing factory 603 subscription service execution 607 and routing execution 508. A message containing a header and application data can be received from a prior hop at hop entry 502. The application data may or may not have been processed at the prior hop. Subscription service execution 607 can execute any of the one or more designated services available at exit hop 601. Routing execution 608 can route processed data to a recipient application.

Turning to FIG. 6B, hop processing factory 603 can build each data processing (e.g., transformation) object, execute objects and evaluate results, and throw exception events and log as needed. Data abstraction 611 provides exit hop 601 with data access 612 to the one or more storage locations, including: cache 441, database 442, file 443, and alternative data store 444. Audit event handler 613 and exception event handler 614 can log events to the one or more storage locations. Header construction 606 can construct a header object 626 from passed header details. Subscription service execution 607 can invoke a service 628, evaluate results 629, and store pertinent information 631 (e.g., metrics) to the one or more storage locations through data access 612. Subscription service execution 607 can continue looping to execute any of one or more designated services available at exit hop 601.

Routing execution 608 can lookup 632 a next forward path for message delivery from the contents of a constructed header and store pertinent information 633 to the one or more storage locations through data access 612. Exit hop 601 can send processed data out of hop exit 609 to the recipient application.

Figure 7A:
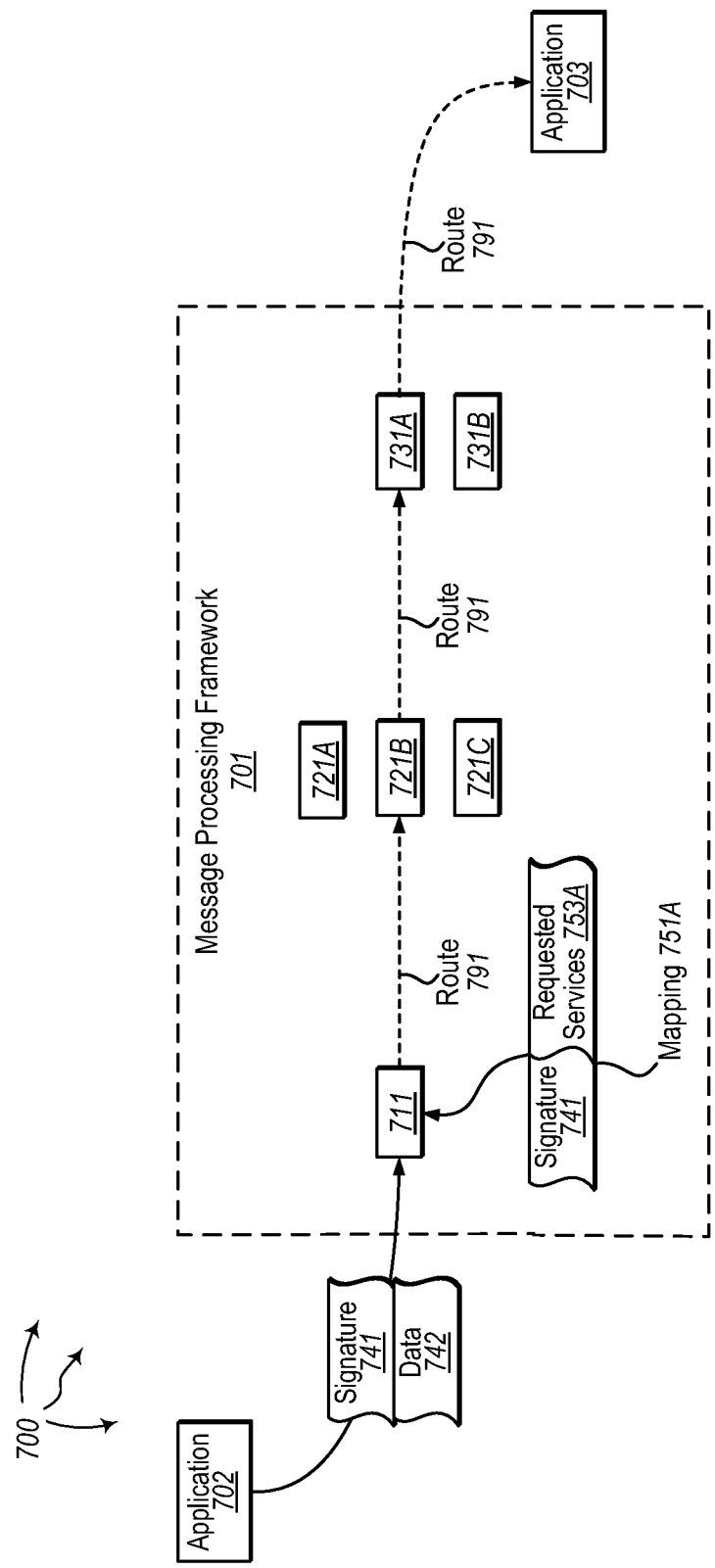
FIGS. 7A and 7B illustrate an example computer architecture that facilitates changing configuration for integrating applications.
Figure 7B:
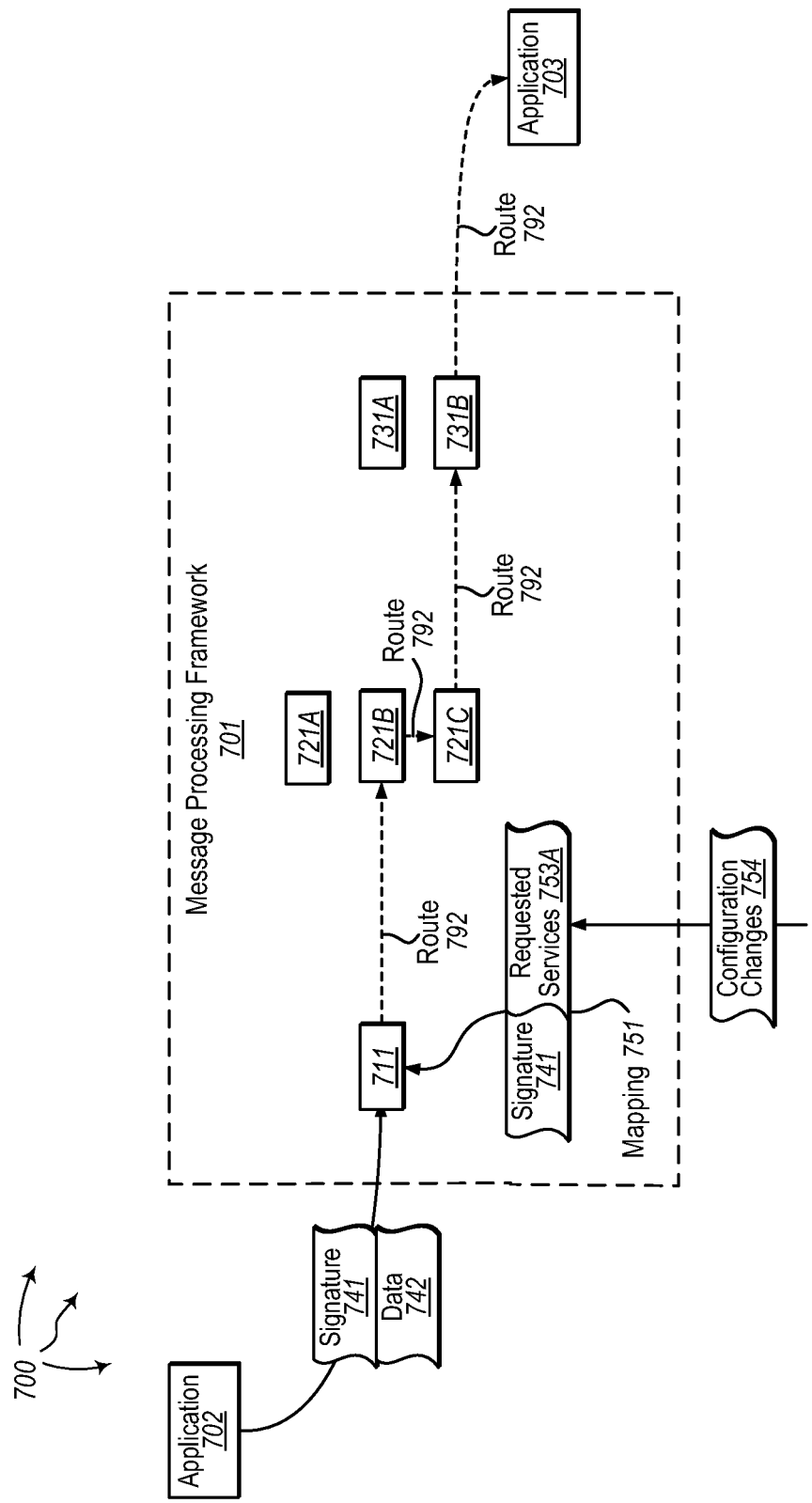

FIGS. 7A and 7B illustrate an example computer architecture 700 that facilitates changing configuration for integrating applications. As depicted, computer architecture 700 includes message processing framework 701, application 702, and application 703. Message processing framework 701, application 702, and application 703 can be connected to one another via a network, such as, for example, a local area network (LAN), a wide area network (WAN), or any other type of communication network. In one exemplary embodiment, the network comprises the Internet, and messages are communicated across the network using transmission control protocol/Internet protocol (TCP/IP). However, other types of networks and other types of protocols can be used.

Referring to FIG. 7A, Message processing framework 701 includes entry hop 711, intermediate hops 721A, 721B, and 721C, and exit hops 731A, and 731B and mapping 751. Application 702 can send signature 741 and data 742 to message processing framework 701 to have data 742 delivered to application 703. Entry hop 711 can receives signature 741 and data 742. Entry hop 711 can refer to mapping 751 to determine that signature 741 maps to designated services 753A. Entry hop 711 can further determine that to access designated services 753A, data 742 is to take route 791. Route 791 includes intermediate hop 721B and exit hop 731A. From exit hop 731A, (processed) data 742 can be sent to application 703.

Figure 8:
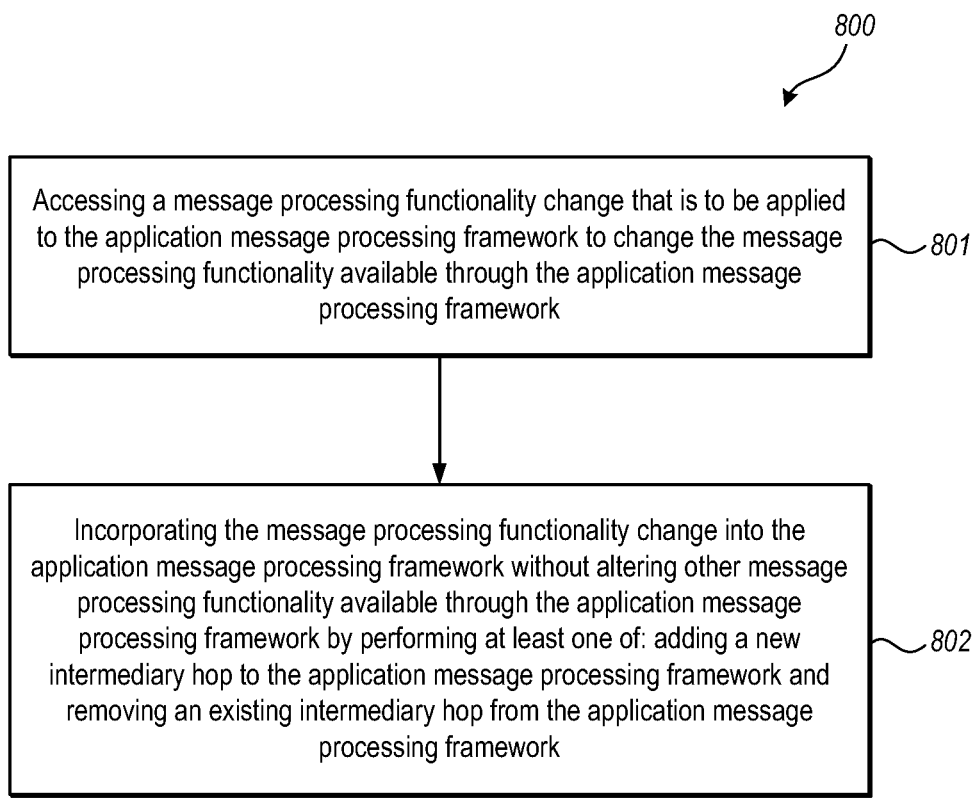
FIG. 8 illustrates an example method for changing configuration for integrating applications.

FIG. 8 illustrates an example method 800 for changing configuration for integrating applications. The method 800 will be described with respect to the components and data of computer architecture 700.

Subsequently it may be determined that the requirements for application 703 are changed such that data sent from application 702 to application 703 is subject to additional and/or changed processing.

Method 800 includes accessing a message processing functionality change that is to be applied to the application message processing framework to change the message processing functionality available through the application message processing framework (801). For example, message processing framework 701 can access configuration change 754. Configuration change 754 can be entered by an administrator or other technical personnel. Configuration change 754 can indicate how data processing is to be changed to incorporate the changes requirements into message processing framework 701.

Method 800 includes incorporating the message processing functionality change into the application message processing framework without altering other message processing functionality available through the application message processing framework by performing at least one of: adding a new intermediary hop to the application message processing framework and removing an existing intermediary hop from the application message processing framework (802). For example, configuration change 753 can be incorporated into mapping 751. After incorporating configuration change 753 into mapping 751, signature 741 maps to designated services 753B. Designated services 753B can include different designated services than designated services 753A.

Subsequently, application 702 can again send signature 741 and data 742 to message processing framework 701. Entry hop 711 can refer to mapping 751 to determine that signature 741 now maps to designated services 753B. Entry hop 711 can further determine that to access designated services 753B, data 742 is to take route 792. Route 791 includes intermediate hop 721B, intermediate hop 721C (e.g., including a $3^{rd}$ party data enrichment service), and exit hop 731B. From exit hop 731B, (processed) data 742 can be sent to application 703.

As such, hops where services are applied to data 742 can be changed without changing applications 702 or 703 and without changing the configuration of hops within message processing framework 701.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

The invention claimed is:

1. A processor-implemented method for use at a computer system, the computer system including system memory, the computer system implementing a series of hops within a centralized message processing framework, each hop offering one or more data processing services, each of the one or more data processing services configured to transform data in a defined manner, each hop configured for inclusion in a route between applications, the processor-implemented method comprising:
    sending a signature and data from a first application to an entry hop, formulating a header, wherein formulating the header comprises:
    defining a route indicating an order of the series of hops, and
        providing an indication of which of the data processing services are to be implemented at each of the series of hops;
    combining the header and the data to form a message;
    sending the message from the entry hop to one of a plurality of intermediate hops based upon the order of the series of hops defined in the header, the intermediate hops each configured to process the message;
    sending the processed message from one of the plurality of intermediate hops to an exit hop based upon the order in the series of hops defined in the header; and
    routing formatted data from the exit hop to a second application, wherein the centralized message processing framework provides message-processing functionality for the first application and the second application, and the first application and the second application do not include independent message-processing functionality.

2. The processor-implemented method of claim 1, further comprising processing the message at each intermediate hop based upon a corresponding instruction in the header.

3. The processor-implemented method of claim 1, further comprising formatting the processed message received from the intermediate hop at the exit hop to generate the formatted data via a formatting module.

4. The processor-implemented method of claim 3, wherein the formatted data is configured to be compatible with the second application.

5. The processor-implemented method of claim 1, further comprising formatting the header at the entry hop.

6. The processor-implemented method of claim 1, wherein the exit hop further comprises a service execution module.

7. The processor-implemented method of claim 1, further comprising sending return data from the second application to the first application via the centralized message processing framework.

8. The processor-implemented method of claim 7, wherein the return data passes through the series of hops in reverse of the order.

9. The processor-implemented method of claim 7, further comprising processing the return data by the same data processing services that were used to process the data.

10. A system for centralized message processing that reduces or eliminates the need to incorporate independent message processing functionality in a first application and a second application, the system comprising:
    a metrics database configured to collect metrics cataloged during the execution of services at each of a plurality of hops between the first application and the second application;
    a plurality of mappings configured to identify designated routes between the first application and the second application;
    an entry hop configured to receive a signature and data from the first application, the entry hop comprising:
        a header construction module configured to formulate a header defining a route through the plurality of hops based upon the signature and the plurality of mappings, and to combine the header with the data to form a message, and
        a routing module configured to route the message to one of the plurality of hops, and
    an exit hop configured to format the routed message for use in the second application.

11. The system of claim 10, wherein the metrics database is configured to collect metrics corresponding to processing time and execution success.

12. The system of claim 10, wherein the header construction module is further configured to provide an indication of which of the data processing services are to be implemented at each of the plurality of hops.

13. The system of claim 10, wherein the plurality of hops includes a plurality of intermediate hops each configured to process the message based upon a corresponding instruction in the header.

14. The system of claim 10, wherein the exit hop comprises a formatting module configured to format the routed message to generate the formatted data.

15. The system of claim 10, wherein the exit hop comprises a routing module configured to route the formatted data to the second application based upon the contents of the routed message.

16. The system of claim 13, wherein each of the intermediate hops comprises a service execution module configured to invoke one or more of the services.

17. The system of claim 16, wherein the service execution module is further configured to send the metrics to the metrics database.

18. The system of claim 10, wherein the system is configured to receive return data from the second application and to route the return data to the first application.

19. The system of claim 18, wherein the return data is routed from the second application to the first application in reverse of the route.

20. The system of claim 19, wherein the return data is processed by the same data processing services as the data.

* * * * *